(12) United States Patent
Liao

(10) Patent No.: US 7,969,671 B2
(45) Date of Patent: Jun. 28, 2011

(54) VOICE COIL MOTOR HAVING HOLES AND SOCKETS FOR RECEIVING POSITIONING MEMBERS

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/567,867

(22) Filed: Sep. 28, 2009

(65) Prior Publication Data
US 2010/0123960 A1    May 20, 2010

(30) Foreign Application Priority Data
Nov. 17, 2008   (CN) .......................... 2008 1 0305593

(51) Int. Cl.
*G02B 7/02* (2006.01)
(52) U.S. Cl. .......................... 359/824; 359/811; 359/819
(58) Field of Classification Search .......... 359/694–704, 359/811–824
See application file for complete search history.

(56) References Cited

U.S. PATENT DOCUMENTS

| | | | |
|---|---|---|---|
| 7,746,579 B2 * | 6/2010 | Ke | 359/814 |
| 7,764,450 B2 * | 7/2010 | Chou et al. | 359/824 |
| 7,782,556 B2 * | 8/2010 | Chou | 359/819 |
| 7,817,358 B2 * | 10/2010 | Ke | 359/811 |

\* cited by examiner

*Primary Examiner* — Mohammed Hasan
(74) *Attorney, Agent, or Firm* — Raymond J. Chew

(57) ABSTRACT

An exemplary voice coil motor includes a housing and a movable unit. A top panel of the housing has two positioning through holes. The movable unit includes a barrel holder, and a coil wrapped around the barrel holder. The barrel holder has two positioning sockets corresponding to the two positioning through holes. Each of two positioning members is fittingly received through one positioning hole and in the corresponding positioning socket, such that the barrel holder is fixed relative to the housing while the positioning members are engaged in the positioning through holes and the positioning sockets.

14 Claims, 4 Drawing Sheets

US 7,969,671 B2

VOICE COIL MOTOR HAVING HOLES AND SOCKETS FOR RECEIVING POSITIONING MEMBERS

CROSS REFERENCE TO RELATED APPLICATION

This application is related to a commonly-assigned copending application Ser. No. 12/251,730, entitled "lens actuator," and filed on Oct. 15, 2008. The disclosure of the above-identified application is incorporated herein by reference.

BACKGROUND

1. Technical Field

The present disclosure relates to lens actuators, and particularly to a voice coil motor having positioning holes and corresponding positioning sockets configured for cooperatively receiving positioning members.

2. Description of Related Art

Generally, lens modules employ an actuator such as a voice coil motor to move a lens barrel (containing at least one lens) relative to an image sensor, thereby varying a distance between the lens(es) and the image sensor to obtain a desired focal length.

A typical voice coil motor includes a barrel holder for accommodating a lens barrel, a coil wrapped around the barrel holder, a plurality of magnets, a bracket bearing the magnets and accommodating the barrel holder, and a resilient plate interconnecting the bracket and the barrel holder for holding the barrel holder on the bracket. When an electric current is applied to the coil, a magnetic force is produced between the magnets and the coil, and the barrel holder with the lens barrel is moved relative to the magnets. When the electric current is cut off, the barrel holder with the lens barrel is reset to its original position under a resilient force applied by the resilient plate.

During assembly of the lens module, the resilient plate is attached on an end surface of the bracket, and the barrel holder is accommodated in the bracket with an end of the barrel holder connected with a resilient portion of the resilient plate. Then an external torque is applied on an end of the lens barrel to screw the lens barrel into the barrel holder until the lens or lenses inside the lens barrel arrive(s) at the optimum focal plane. Accordingly, the resilient plate simultaneously bears a horizontal friction force and the torque transmitted from the barrel holder. The friction force keeps the resilient plate still. If the values of the friction force and the torque exceed the maximum values the resilient plate can bear, the resilient plate is inevitably distorted or damaged.

Therefore, what is needed is a voice coil motor to overcome the problems described above.

BRIEF DESCRIPTION OF THE DRAWINGS

Many aspects of the present voice coil motor can be better understood with reference to the following drawings. The components in the drawings are not necessarily drawn to scale, the emphasis instead being placed upon clearly illustrating the principles of embodiments of the voice coil motor. Moreover, in the drawings, all the views are schematic, and like reference numerals designate corresponding parts throughout the different views.

DETAILED DESCRIPTION

Figure 1:
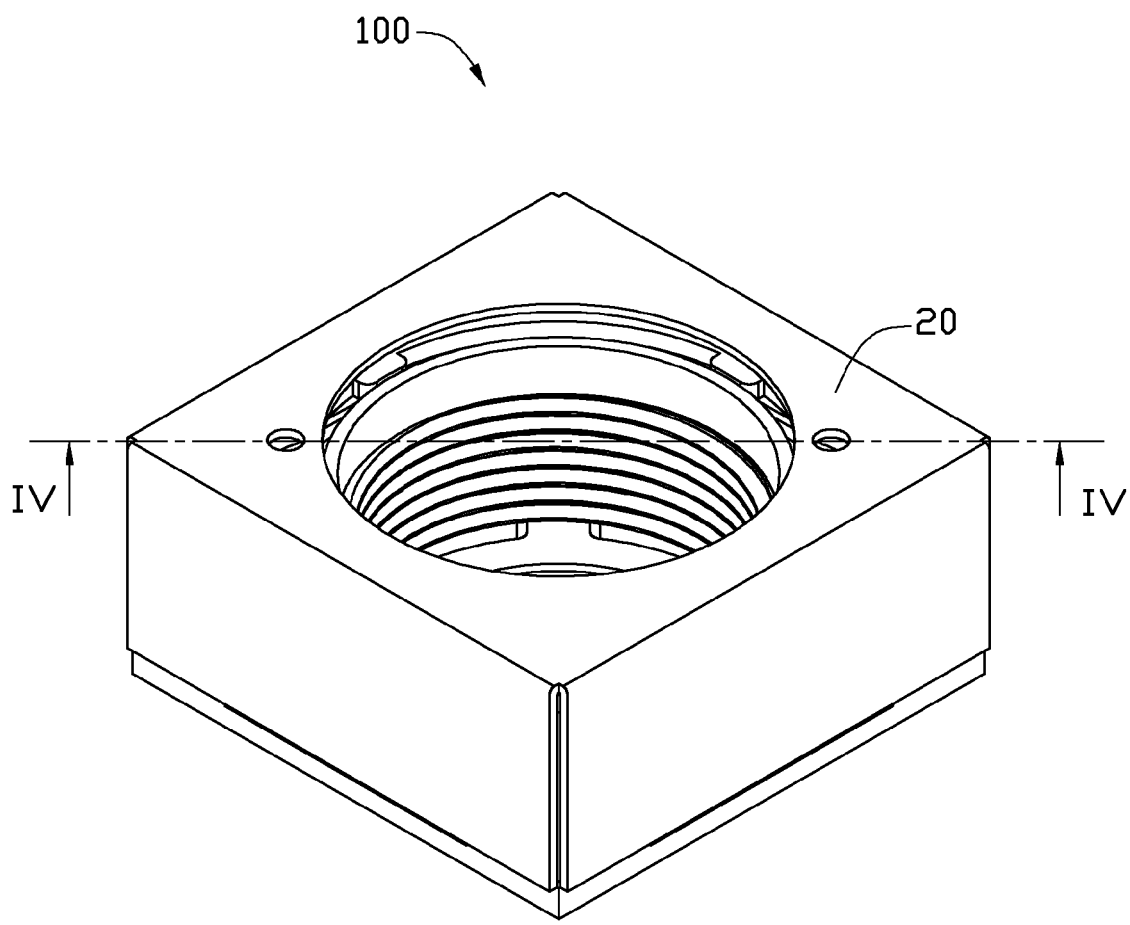
FIG. 1 is an isometric view of a voice coil motor in accordance with an exemplary embodiment, wherein the voice coil motor includes a housing, a fixed unit, a movable unit, and a resilient plate.
Figure 2:
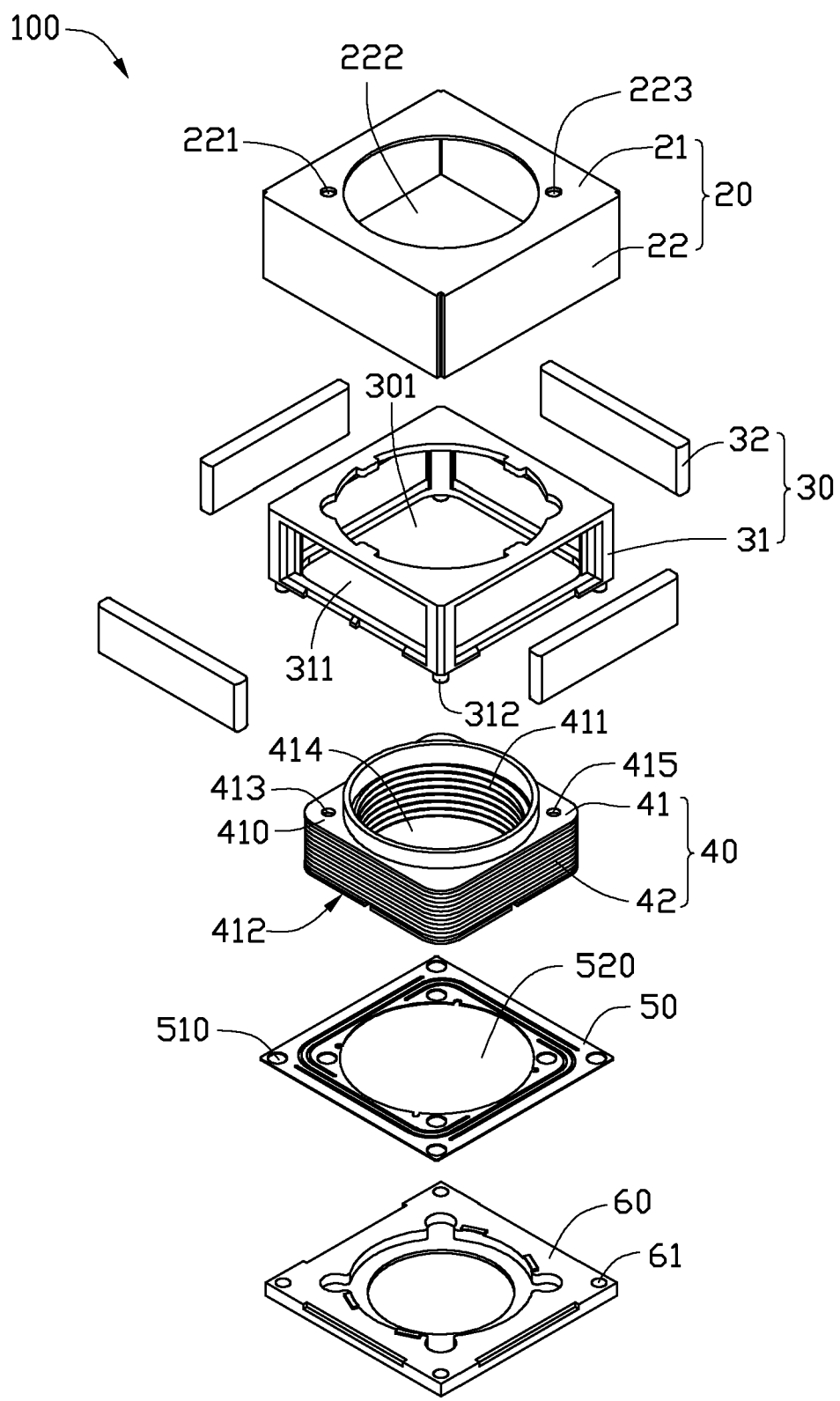
FIG. 2 is an exploded view of the voice coil motor of FIG. 1.

Referring to FIGS. 1 and 2, a voice coil motor 100 in accordance with an exemplary embodiment includes a housing 20, a fixed unit 30, a movable unit 40, a resilient plate 50, and a base 60.

The housing 20 includes a top panel 21, and four side panels 22 extending from four peripheral sides of the top panel 21. The top panel 21 and the side panels 22 cooperatively define an accommodating space for the fixed unit 30, the movable unit 40, and the resilient plate 50. The top panel 21 defines a first light passage 222 in a central portion thereof, and a first positioning hole 221 and a second positioning hole 223 in a peripheral portion thereof. Both the first and second positioning holes 221, 223 pass through two opposite top and bottom surfaces of the top panel 21. The first positioning hole 221 is separated from the second positioning hole 223 by the first light passage 222. In the illustrated embodiment, the first and second positioning holes 221, 223 are diametrically opposite each other across the middle of the first light passage 222. The housing 20 is comprised of electromagnetic shielding material, such as nickel alloy, conductive plastic, a surface conductive material, conductive glass, or another suitable shielding material.

The fixed unit 30 includes a cubic bracket 31 and four magnets 32. The bracket 31 is a generally rectangular frame-like structure with four open sides. The bracket 31 defines a first accommodation room 301 for accommodating the movable unit 40, and the four open sides define four magnet mounting holes 311 respectively. The magnet mounting holes 311 are in communication with the first accommodation room 301. Four locating pins 312 extend vertically down from four corners of a bottom side of the bracket 31, respectively. The locating pins 312 are configured for connecting the fixed unit 30 to the resilient plate 50. The four magnets 32 are mounted in the magnet mounting holes 311, and surround the movable unit 40.

The movable unit 40 includes a barrel holder 41, and a coil 42 wrapped around the barrel holder 41. The barrel holder 41 has a top surface 410 and a bottom surface 412 at opposite sides thereof, and defines a second accommodation room 414. The second accommodation room 414 is for receiving a lens barrel 80 (see FIG. 4), which contains at least one lens. In particular, the barrel holder 41 has an inner surface surrounding the second accommodation room 414. The inner surface has a thread 411 for mating with an external thread of the lens barrel 80 when the lens barrel 80 is screwed into the barrel holder 41. Four positioning posts (not visible in FIG. 2) extend vertically down from the bottom surface 412. A first and a second positioning sockets 413, 415 are provided at two corner portions of the top surface 410, respectively. The two positioning sockets 413, 415 correspond to the two positioning holes 221, 223.

Figure 3:
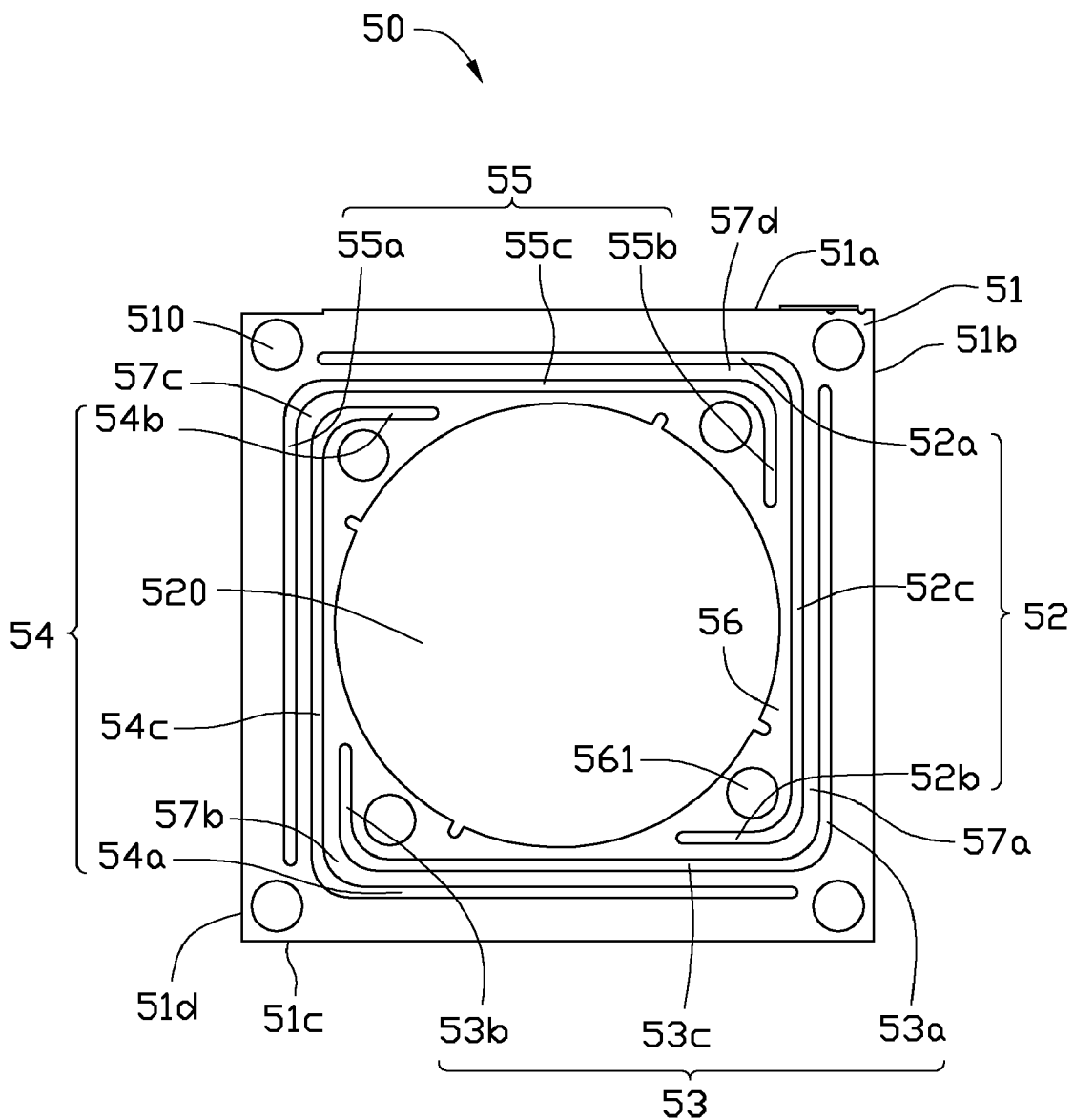
FIG. 3 is a top plan view of the resilient plate of FIG. 1.

Referring to FIGS. 2 and 3, the resilient plate 50 includes a plate body 51 having a first edge 51a, a second edge 51b, a third edge 51c, and a fourth edge 51d. The resilient plate 50 defines a through hole 510 in each of four corners thereof, and a second light passage 520 in a center portion thereof. The second light passage 520 is coaxial with the first light passage 222. The resilient plate 50 is connected with the bracket 31 and attached to the base 60 in a manner such that each of the locating pins 312 of the bracket 31 is fittingly received in a corresponding through hole 510. The first edge 51a is parallel to the third edge 51c, and the second edge 51b is parallel to the fourth edge 51d.

A first slot 52, a second slot 53, a third slot 54, and a fourth slot 55 are defined in the plate body 51 around the second light passage 520. All four slots 52, 53, 54, 55 have the same generally U-shaped configuration, and the same size. Each slot 52, 53, 54, 55 is oriented as if it has been rotated 90 degrees in a clockwise direction from the corresponding neighboring slot 55, 52, 53, or 54. In another aspect, each slot 52, 53, 54, 55 is oriented as if it has been rotated 90 degrees in a counterclockwise direction from the corresponding neighboring slot 53, 54, 55, or 52.

The first slot 52 includes a first starting portion 52a, a first ending portion 52b, and a first connecting portion 52c. The first starting portion 52a is parallel and adjacent to the first edge 51a. The first ending portion 52b is parallel to the third edge 51c. The first connecting portion 52c is parallel to the second edge 51b, and interconnects the first starting portion 52a and the first ending portion 52b. The first ending portion 52b is shorter than or the same length as the first starting portion 52a. In the illustrated embodiment, the first ending portion 52b is much shorter than the first starting portion 52a.

The second slot 53 includes a second starting portion 53a, a second ending portion 53b, and a second connecting portion 53c. The second starting portion 53a is parallel and adjacent to the second edge 51b. The second ending portion 53b is parallel to the fourth edge 51d. The second connecting portion 53c is parallel to the third edge 51c, and interconnects the second starting portion 53a and the second ending portion 53b. The second ending portion 53b is shorter than or the same length as the second starting portion 53a. In the illustrated embodiment, the second ending portion 53b is much shorter than the second starting portion 53a. The second starting portion 53a and the second connecting portion 53c are at an outer side of the first slot 52. That is, the second starting portion 53a and the second connecting portion 53c are closer to the second edge 51b and the third edge 51c than the first connecting portion 52c and the first ending portion 52b of the first slot 52, respectively.

The third slot 54 includes a third starting portion 54a, a third ending portion 54b, and a third connecting portion 54c. The third starting portion 54a is parallel and adjacent to the third edge 51c. The third ending portion 54b is parallel to the first edge 51a. The third connecting portion 54c is parallel to the second edge 51b, and interconnects the third starting portion 54a and the third ending portion 54b. The third ending portion 54b is shorter than or the same length as the third starting portion 54a. In the illustrated embodiment, the third ending portion 54b is much shorter than the third starting portion 54a. The third starting portion 54a and the third connecting portion 54c are at an outer side of the second slot 53. That is, the third starting portion 54a and the third connecting portion 54c are closer to the third edge 51c and the fourth edge 51d than the second connecting portion 53c and the second ending portion 53b of the second slot 53, respectively.

The fourth slot 55 includes a fourth starting portion 55a, a fourth ending portion 55b, and a fourth connecting portion 55c. The fourth starting portion 55a is parallel and adjacent to the third edge 51c. The fourth ending portion 55b is parallel to the second edge 51b. The fourth connecting portion 55c is parallel to the first edge 51a, and interconnects the fourth starting portion 55a and the fourth ending portion 55b. The fourth ending portion 55b is shorter than or the same length as the fourth starting portion 55a. In the illustrated embodiment, the fourth ending portion 55b is much shorter than the fourth starting portion 55a. The fourth starting portion 55a and the fourth connecting portion 55c are at an outer side of the third slot 54. That is, the fourth starting portion 55a and the fourth connecting portion 55c are closer to the first edge 51a and the third edge 51c than the third connecting portion 54c and the third ending portion 54b of the third slot 54, respectively.

A fixing portion 56 is formed between the second light passage 520 and the group of four slots 52, 53, 54, 55. The fixing portion 56 defines four pinholes 561 in four corners thereof, respectively, for fittingly receiving the positioning posts of the barrel holder 41. A first generally L-shaped resilient portion 57a is defined between the first slot 52 and the second slot 53. A second generally L-shaped resilient portion 57b is defined between the second slot 53 and the third slot 54. A third generally L-shaped resilient portion 57c is defined between the third slot 54 and the fourth slot 55. A fourth generally L-shaped resilient portion 57d is defined between the fourth slot 55 and the first slot 52. Since the L-shaped resilient portions 57a, 57b, 57c, 57d all have essentially angular configurations and cooperatively overlap each other in part to surround the second light passage 520, the durability and flexibility of the bottom resilient plate 50 are enhanced.

The base 60 has four fixing sockets 61 defined in four corners thereof, respectively. The locating pins 312 pass through the though holes 510 and are fittingly received in the fixing sockets 61. The base 60 and the housing 20 thereby cooperatively receive the movable unit 40, the fixed unit 30, and the resilient plate 50. Furthermore, the housing 20 and the base 60 can protect the lens barrel 80 and an image sensor (not shown) from outside contaminants such as dust.

Figure 4:
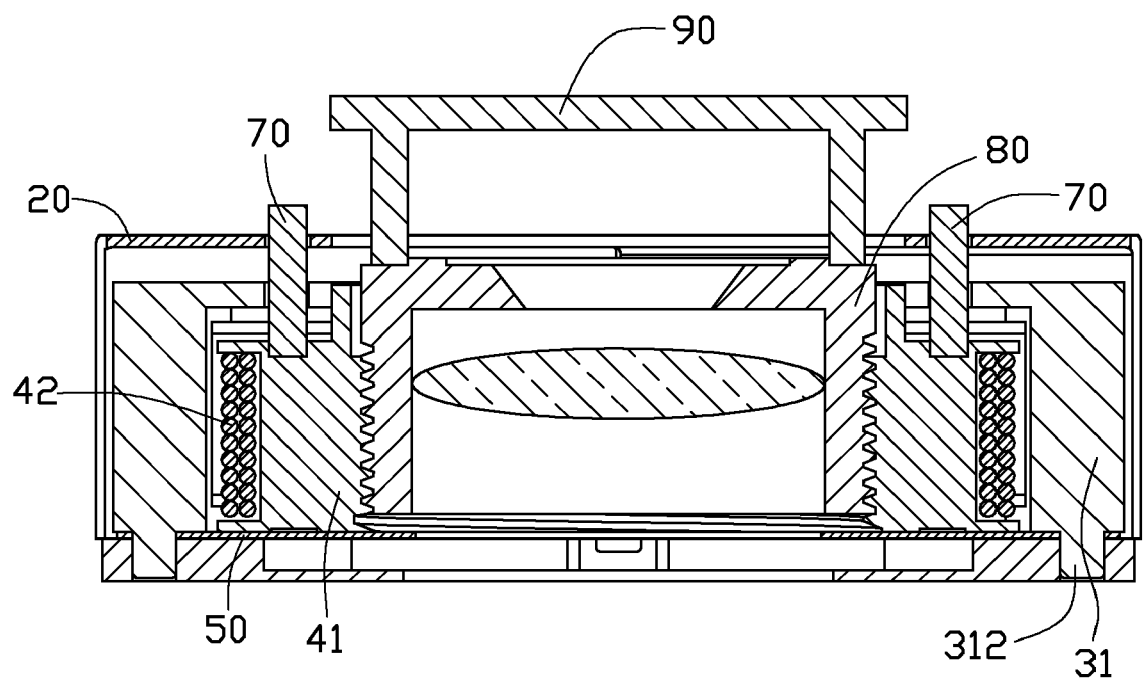
FIG. 4 is a side cross-sectional view corresponding to line IV-IV of FIG. 1, showing a lens barrel being installed into the voice coil motor.

Referring to FIGS. 2 and 4, in this embodiment, the lens barrel 80 contains a single lens. The voice coil motor 100 can be combined with the lens barrel 80 to form a lens module. As shown in FIG. 4, two positioning members 70 are employed. As illustrated, the positioning members 70 are in the form of positioning pins. The positioning members 70 are inserted into the first and second positioning holes 221, 223 and the first and second positioning sockets 413, 415 of the voice coil motor 100, thereby connecting the barrel holder 41 to the housing 20. The housing 20 is keep still by applying an external force thereto, such as with a clamp (not shown). A torque tool 90 is engaged with a top of the lens barrel 80, and an external torque is applied to the lens barrel 80 to screw the lens barrel 80 into the barrel holder 41. That is, the torque tool 90 rotates the lens barrel 80 about a center axis of the lens barrel 80, while the barrel holder 41 is fixed to the housing 20 and does not rotate with the lens barrel 80. Therefore, essentially no friction force occurs between the resilient plate 50 and the barrel holder 41. Furthermore, the resilient plate 50 accommodated in the housing 20 is separated from the housing 20 by the bracket 31, therefore the resilient plate 50 does not bear any of the torque at all. In this way, the resilient plate 50 is protected from damage. After screwing the lens barrel 80 to a position corresponding to an optimum focal plane, the torque tool 90 and the positioning members 70 are removed, and the housing 20 is adhered to the base 60. Thereby, the lens module is obtained.

Furthermore, the number of magnets 32 and the number of positioning holes 221, 223 are not limited to the above descriptions. In other embodiments, the positioning holes 221, 223 are defined in the same corner portion of the top panel 21, or at the same side of the first light passage 222.

While certain embodiments have been described and exemplified above, various other embodiments will be apparent from the foregoing disclosure to those skilled in the art.

The present invention is not limited to the particular embodiments described and exemplified but is capable of considerable variation and modification without departure from the scope and spirit of the appended claims.

What is claimed is:

1. A voice coil motor, comprising:
a housing including a top panel and a side panel, the top panel having a plurality of positioning through holes, and a first light passage; and
a movable unit including a barrel holder and a coil wrapped around the barrel holder, the barrel holder having a plurality of positioning sockets at a top surface thereof, the positioning sockets aligned with the positioning through holes, and the barrel holder structured and arranged to threadingly receive a lens barrel;
wherein each positioning through hole and the corresponding positioning socket are configured for cooperatively removably receiving a positioning member therein, such that the barrel holder is fixed relative to the housing while the positioning members are engaged in the positioning through holes and the positioning sockets.

2. The voice coil motor of claim 1, wherein the positioning through holes are defined in a same corner of the top panel.

3. The voice coil motor of claim 1, wherein the positioning through holes comprise two positioning through holes, which are defined in two corners of the top panel, respectively.

4. The voice coil motor of claim 1, wherein the positioning through holes are at a same side of the light passage.

5. The voice coil motor of claim 1, wherein the light passage is in a central portion of the top panel.

6. The voice coil motor of claim 5, wherein the positioning through holes comprise a first positioning through hole and a second positioning through hole, and the first positioning through hole is separated from the second positioning through hole by the light passage.

7. The voice coil motor of claim 6, wherein the first and second positioning through holes are diametrically opposite each other across the middle of the light passage.

8. The voice coil motor of claim 1, further comprising:
a resilient plate; and
a fixed unit including a bracket and a plurality of magnets, the bracket being configured for accommodating the movable unit and the magnets;
wherein the resilient plate and the fixed unit are received in the housing, and the resilient plate is connected with the bracket for holding the barrel holder in the bracket in a passive position.

9. The voice coil motor of claim 8, wherein the bracket is a frame-like structure with a plurality of open sides, each open side defines a magnet mounting hole, and the magnets are mounted in the magnet mounting holes and surround the movable unit.

10. The voice coil motor of claim 8, wherein the resilient plate is separated from the housing by the bracket.

11. The voice coil motor of claim 8, wherein the resilient plate comprises a plate shaped body, the body comprising a second light passage defined in the center thereof and a plurality of slots cooperatively surrounding the second light passage, the body further comprising a fixing portion, wherein each of the slots includes a starting portion, an end portion and a connecting portion, the connecting portion is substantially perpendicular to and interconnects the starting and end portions, each two adjacent slots are oriented substantially 90 degrees with respect to each other, the fixing portion is located between the second light passage and the plurality of slots, the fixing portion defines a pinhole in each corner thereof, and the barrel holder comprises a plurality of positioning pins engagingly extending through the pinholes such that the resilient plate is fixed to the barrel holder.

12. A voice coil motor, comprising:
a housing including a top panel and a side panel, the top panel having a first means for detachably engagingly receiving an elongate positioning member;
a movable unit including a barrel holder and a coil wrapped around the barrel holder, the barrel holder structured and arranged to threadingly receive a lens barrel, the barrel holder having a second means for detachably engagingly receiving the elongate positioning member such that the barrel holder is fixed relative to the housing while the elongate positioning member is engaged in the first and second means.

13. A voice coil motor assembly, comprising:
a plurality of elongate positioning members; and
a voice coil motor, the voice coil motor comprising a housing and a movable unit;
the housing including a top panel and a side panel, the top panel having a plurality of positioning through holes, and a first light passage;
the movable unit including a barrel holder and a coil wrapped around the barrel holder, the barrel holder having a plurality of positioning sockets at a top surface thereof, the positioning sockets aligned with the positioning through holes, and the barrel holder structured and arranged to threadingly receive a lens barrel;
wherein each positioning through hole and the corresponding positioning socket are configured for cooperatively removably receiving one of the positioning members therein, such that the barrel holder is fixed relative to the housing while the positioning members are engaged in the positioning through holes and the positioning sockets.

14. The voice coil motor assembly of claim 13, wherein the positioning members are positioning pins.

* * * * *